United States Patent [19]

Lane, Jr.

[11] Patent Number: 4,667,067
[45] Date of Patent: May 19, 1987

[54] SWITCH ASSEMBLY WITH MULTIPLE MOUNTING MEANS

[75] Inventor: Wendell C. Lane, Jr., Laurinburg, N.C.

[73] Assignee: Dana Corporation, Toledo, Ohio

[21] Appl. No.: 728,568

[22] Filed: Apr. 29, 1985

[51] Int. Cl.$^4$ .............................................. H01H 9/02
[52] U.S. Cl. ............................... 200/61.54; 248/221.4; 248/223.4
[58] Field of Search ............... 200/61.54, 61.27, 61.34, 200/294, 296; 361/370; 180/177; 248/221.4, 223.4, 224.1, 224.2; 403/3, 4, 381

[56] References Cited

U.S. PATENT DOCUMENTS

| | | | |
|---|---|---|---|
| 3,761,662 | 9/1973 | Charles | 200/153 D |
| 3,859,489 | 1/1975 | Tomlinson | 200/157 |
| 3,934,101 | 1/1976 | Jones | 200/5 B |
| 4,219,706 | 8/1980 | Koch et al. | 200/4 |
| 4,321,437 | 3/1982 | Cryer | 200/61.54 |
| 4,400,598 | 8/1983 | Jandl et al. | |
| 4,404,438 | 9/1983 | Honjo | 200/61.54 |
| 4,543,456 | 9/1985 | Iwata et al. | 200/61.54 |

OTHER PUBLICATIONS

"Cruise Control Installation Manual", published by Cal Custom Hawk.

Primary Examiner—A. D. Pellinen
Assistant Examiner—Morris Ginsburg
Attorney, Agent, or Firm—MacMillan & Sobanski

[57] ABSTRACT

A control switch assembly for cruise controls and the like includes multiple mounting adapters which facilitate mounting to a variety of vehicles. The switch assembly housing is a rectangular parallelepiped which defines a mounting structure. The mounting structure receives one of a plurality of interchangeable mounting adapters which engage various components of the vehicle and secure the switch housing thereto. For example, one mounting adapter facilitates mounting of the switch housing on the turn signal lever. Another facilitates mounting to a flat surface and still another replaces a portion of the turn signal lever with the switch housing.

11 Claims, 41 Drawing Figures

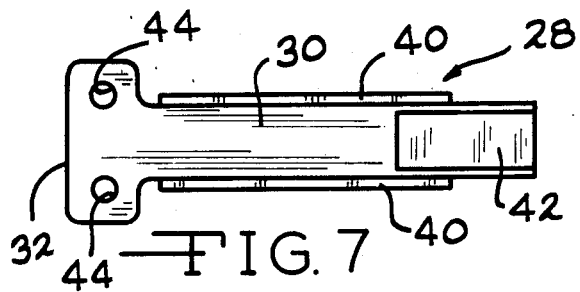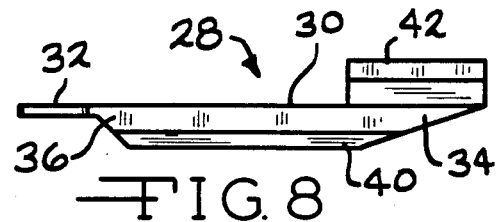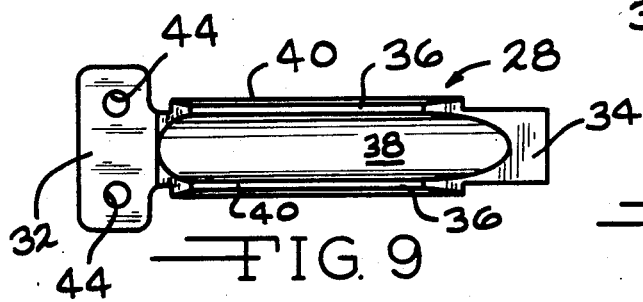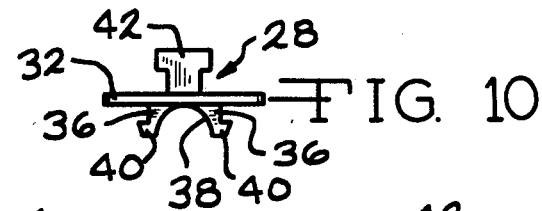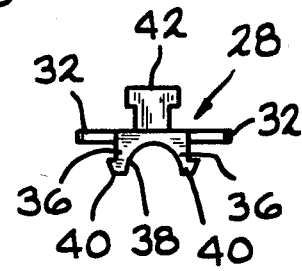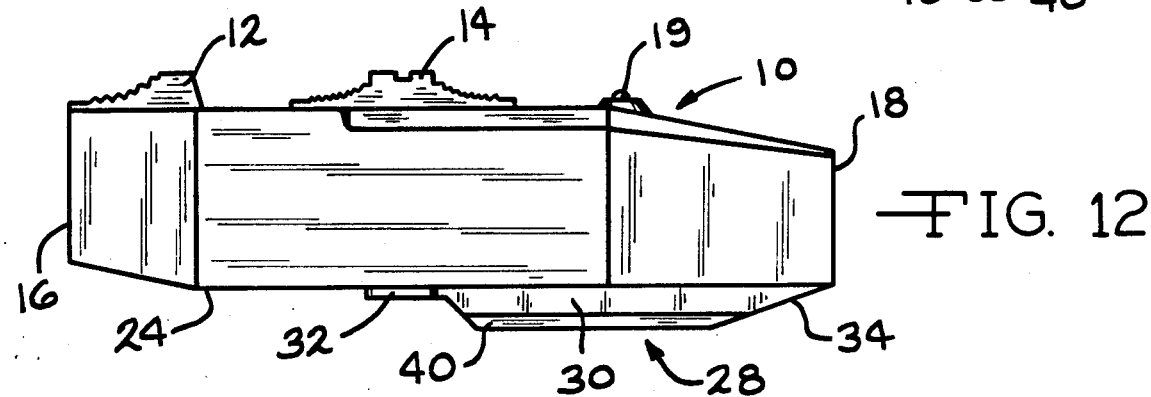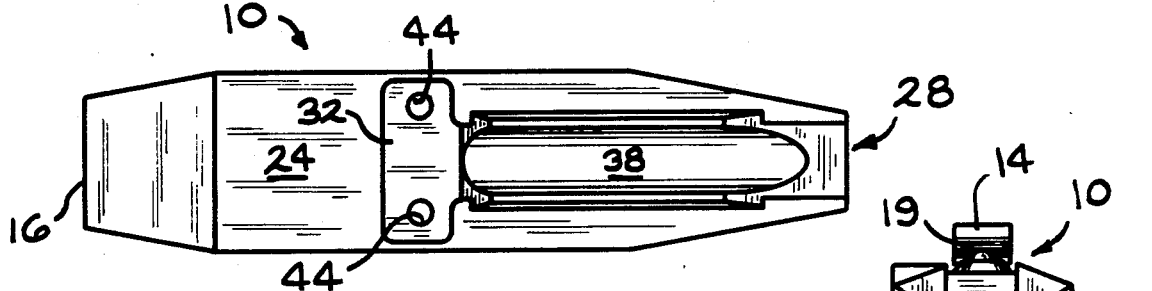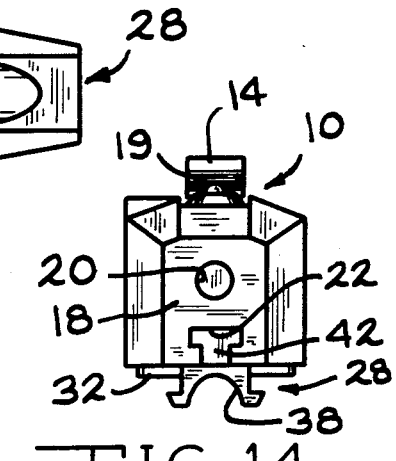

SWITCH ASSEMBLY WITH MULTIPLE MOUNTING MEANS

BACKGROUND OF THE INVENTION

The present invention relates in general to vehicle speed control units, commonly known as cruise control units, and in particular to a switch assembly for such a cruise control having multiple mounting means.

Cruise control units are widely known in the art and are adapted to maintain a vehicle at a constant predetermined speed despite varying engine loads, such as are imposed by the course of the road upon which the vehicle is operated or the wind. While such cruise control units have proven to be very popular, they are not standard or factory-installed items on most vehicles. Thus, there is a large aftermarket for cruise control units which can be installed on existing vehicles. Beyond the standard of reliable and efficient operation, the key considerations effecting the commercial success of such aftermarket cruise control units are the manner and degree of difficulty of installation. These considerations are particularly important when considering the installation of a switch assembly which adapted to be manipulated by the vehicle driver to control the operation of the cruise control unit.

Several factors bear heavily on these considerations, as they relate to the installation of the cruise control switch assembly. First, the switch assembly must be mounted in an easily accessible position relative to the driver. Second, the switch assembly must be safely and securely mounted so as to prevent it from being dislodged or otherwise moved. Third, the mounting means of the switch must be simple to utilize and readily adaptable to vehicles of varying design. Fourth, the switch assembly must be mounted in an aesthetically pleasing manner, so as to not to detract from the overall appearance of the interior of the vehicle. Finally, it is desirable to mount the switch assembly such that it can be removed at a later date without leaving permanent holes, marks, or other disfigurations in the interior of the vehicle.

SUMMARY OF THE INVENTION

The present invention relates to a cruise control switch having multiple mounting means. A housing for the switch is formed generally in the shape of a rectangular parallelepiped. A T-shaped aperture is formed in the housing extending inwardly from one end thereof. The housing aperture is designed to receive one of a plurality of interchangeable mounting adapters therein to permit the housing to be mounted in a desired manner in a vehicle. The adapters permit the housing to be mounted either about an existing turn signal lever in the vehicle, at the end of such a turn signal lever, on a steering column of the vehicle, or on a dashboard of the vehicle.

It is an object of the present invention to provide a cruise control switch having multiple mounting means which is readily adaptable to vehicles of different design.

It is another object of the present invention to provide such a mounting means which reliably secures the cruise control switch to a desired portion of the vehicle.

It is a further object of the present invention to provide such a mounting means which does not permanently damage or otherwise mar the vehicle upon which it is utilized.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 7 is a top plan view of a first mounting adapter in accordance with the present invention.

FIG. 8 is an elevational view of one side of the first adapter illustrated in FIG. 7.

FIG. 9 is a bottom plan view of the first adapter illustrated in FIG. 7.

FIG. 10 is an elevational view of one end of the first adapter illustrated in FIG. 7.

FIG. 11 is an elevational view of the other end of the first adapter illustrated in FIG. 7.

FIG. 12 is a side elevational view of the switch housing of FIG. 1 showing the first adapter of FIG. 7 mounted thereon.

FIG. 13 is a bottom plan view of the switch housing and first adapter of FIG. 12.

FIG. 14 is an elevational view of one end of the switch housing and first adapter of FIG. 12.

DETAILED DESCRIPTION OF THE PREFERRED EMBODIMENTS

Figure 1:
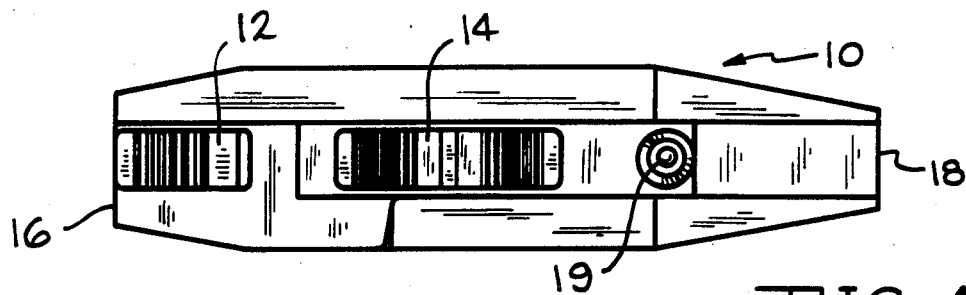
FIG. 1 is a top plan view of a cruise control switch housing in accordance with the present invention.
Figure 2:
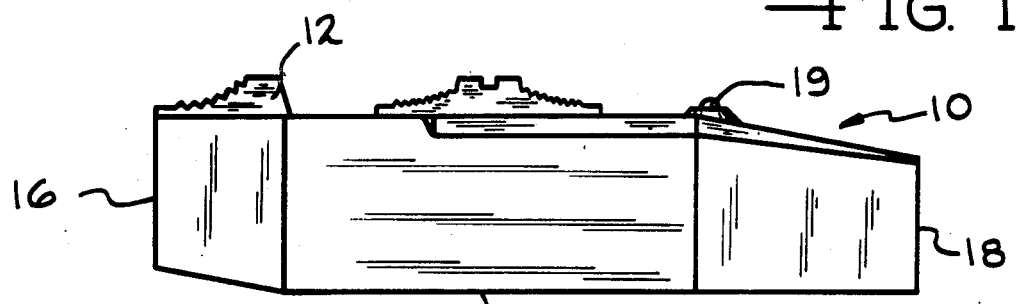
FIG. 2 is an elevational view of one side of the cruise control switch housing illustrated in FIG. 1.
Figure 3:
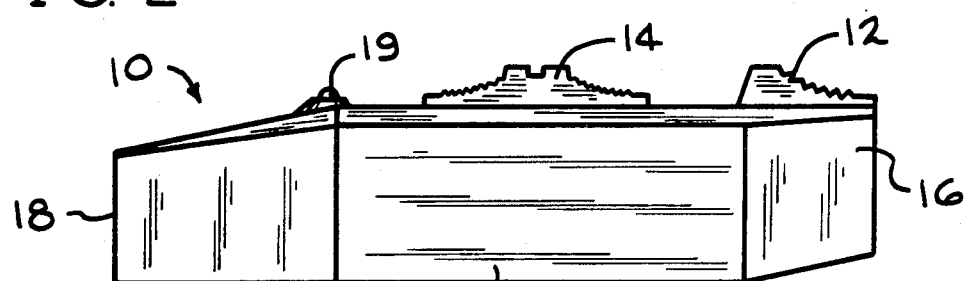
FIG. 3 is an elevational view of the other side of the cruise control switch housing illustrated in FIG. 1.
Figure 4:
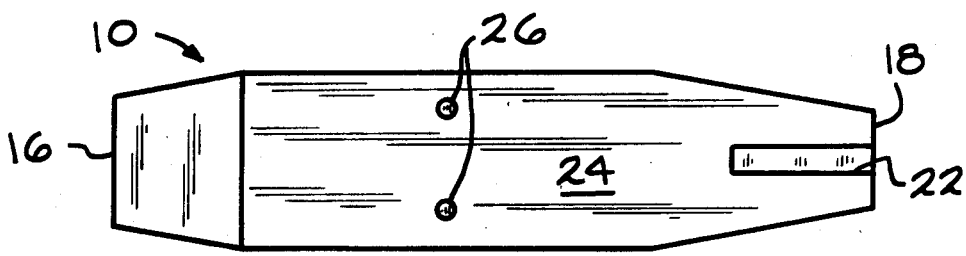
FIG. 4 is a bottom plan view of the cruise control switch housing illustrated in FIG. 1.
Figure 5:
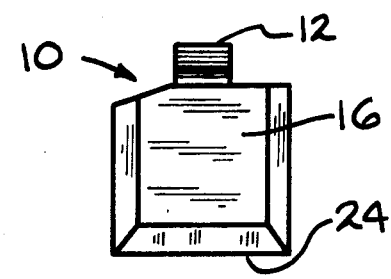
FIG. 5 is an elevational view of one end of the cruise control switch housing illustrated in FIG. 1.
Figure 6:
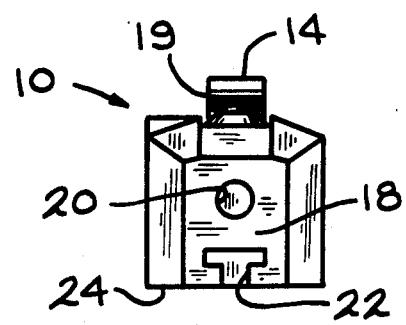
FIG. 6 is an elevational view of the other end of the cruise control switch housing illustrated in FIG. 1.
Figure 15:
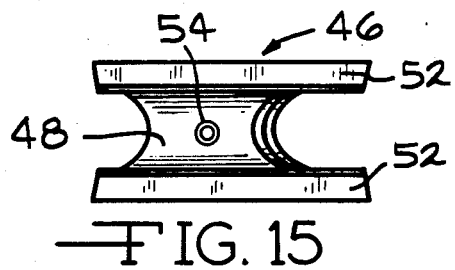
FIG. 15 is a top plan view of a second mounting adapter in accordance with the present invention.
Figure 16:
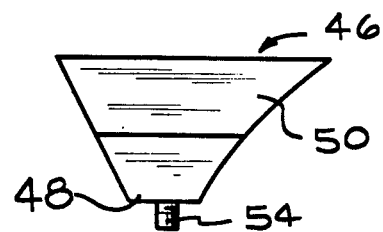
FIG. 16 is a side elevational view of the adapter illustrated in FIG. 15.
Figure 17:
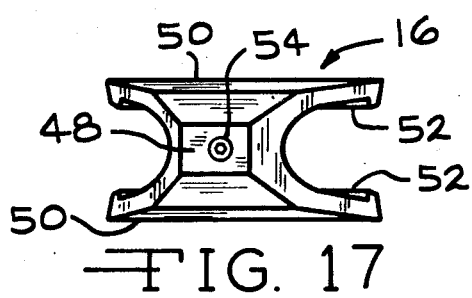
FIG. 17 is a bottom plan view of the second adapter illustrated in FIG. 15.
Figure 18:
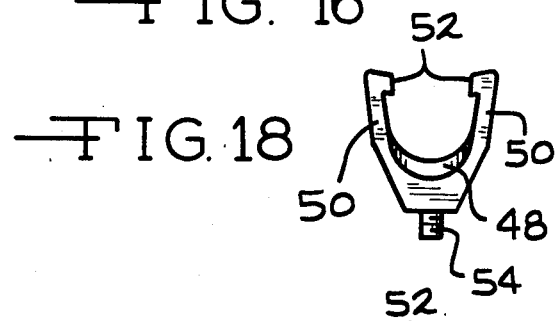
FIG. 18 is an elevational view of one end of the second adapter illustrated in FIG. 15.
Figure 19:
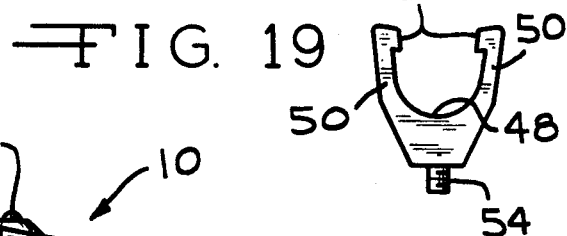
FIG. 19 is an elevational view of the other end of the second adapter illustrated in FIG. 15.

Referring now to the drawings, there is illustrated in FIGS. 1 through 6 a switch housing 10 in accordance with the present invention. The switch housing 10 is formed generally in the shape of a hollow, rectangular parallelepiped and is adapted to carry one or more switches, such as indicated at 12 and 14, thereon. Although the switches 12 and 14 are described and illustrated as controlling the operation of a vehicle cruise control unit (not shown) it should be understood that the switches 12 and 14 are representative of any type of switch or other control device adapted to be manipulated by an operator of the vehicle so as to control the operation of one or more devices contained in the vehicle.

The switch housing 10 can taper slightly inwardly toward a first end 16 (toward the left when viewing FIG. 1), and can also taper slightly inwardly toward a second end 18 (toward the right when viewing FIG. 1). A light emitting diode (LED) 19 can be mounted in the switch housing 10 proximate the second end 18 and providing a visual signal that the cruise control unit on other associated vehicle system is operating. The second end 18 can have an aperture 20 formed therein leading to the interior of the housing 10. The aperture 20 permits the passage of one or more electrical conductors (not shown) which connect the switches 12 and 14 to the cruise control or other device. A T-shaped aperture 22 is also formed in the second end 18 of the housing 10. The T-shaped aperture 22 extends longitudinally inwardly of the switch housing 10. The bottom portion of the aperture 22, which bottom portion forms the base of the T-shape, extends through a bottom surface 24 of the housing 10. A pair of apertures 26 can also be formed in the bottom surface 24 of the switch housing 10, for purposes which will be described below.

The switch housing 10 is adapted to be mounted within the reach of the operator of the vehicle so as to facilitate the easy operation of the cruise control thereby. To accomplish this, and further to permit the switch housing 10 to be mounted in vehicles of varying design, the present invention includes mounting means consisting of several mounting adapters which permit the switch housing to be mounted in a desired manner. FIGS. 7 through 14 illustrate a first mounting adapter, indicated generally at 28, in accordance with the present invention. The first mounting adapter 28 includes a flat elongated body portion 30 extending from an enlarged head portion 32 to a tapered end portion 34. The body portion 30 includes a pair of downwardly-depending side portions 36 which define a curved undersurface 38. Each of the side portions 36 includes an outwardly-extending flange 40. An upstanding T-shaped projection 42 is formed integral with the first adapter 28 above the tapered end 34 of the body portion 30. A pair of apertures 44 can be formed in the enlarged head portion 32.

As illustrated at FIGS. 12 through 14, the T-shaped projection of the first adapter 28 is adapted to cooperate with the T-shaped aperture 22 such that the upper surface of the body portion 30 of the first adapter 28 is adjacent to the bottom surface 24 of the switch housing 10. When so mounted, the apertures 44 formed in the enlarged head portion 32 are aligned with the apertures 26 formed in the bottom surface 24 such that fasteners (not shown) can be threaded therethrough to prevent the removal of the first adapter 28 from the switch housing 10.

Referring now to FIGS. 15 through 21, a second adapter, indicated generally at 46, is provided to cooperate with the first adapter 28. The second adapter 46 has a generally U-shaped configuration including a curved bottom portion 48 and a pair of upstanding sides 50. Each of the sides 50 terminates in an inwardly-extending flange 52. A threaded fastener 54 extends upwardly through a complementarily threaded aperture (not illustrated) formed in the curved bottom portion 48.

Figure 20:
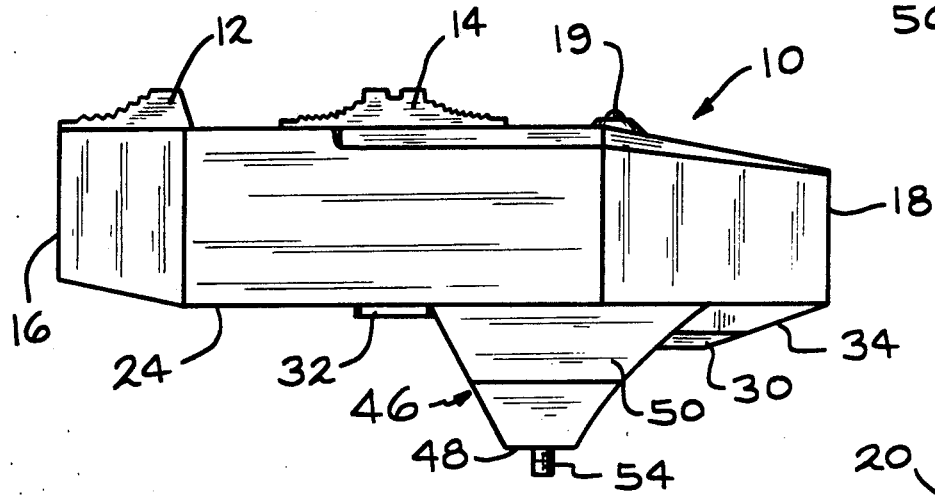
FIG. 20 is a side elevational view of the switch housing and first adapter of FIG. 12 showing the second adapter of FIG. 15 mounted thereon.
Figure 22:
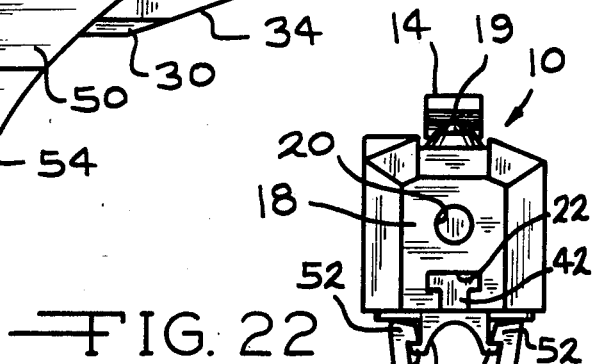
FIG. 22 is an elevational view of one end of the switch housing, first adapter, and second adapter of FIG. 20.
Figure 21:
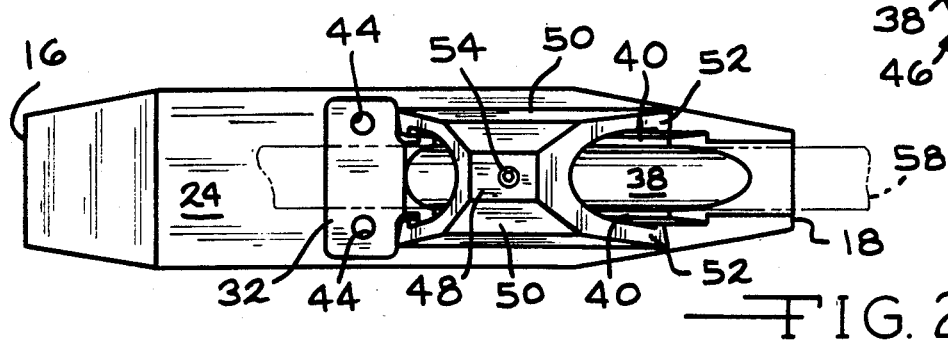
FIG. 21 is a bottom plan view of the switch housing, first adapter, and second adapter of FIG. 20.
Figure 23:
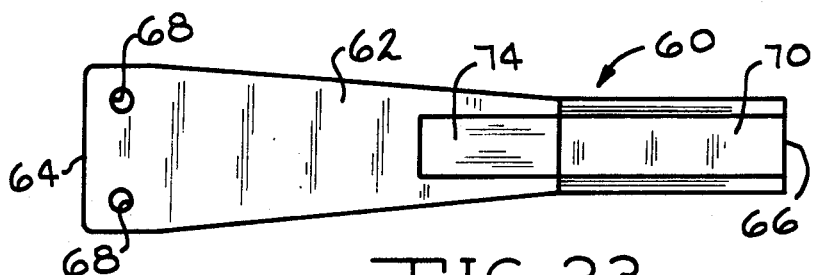
FIG. 23 is a top plan view of a third adapter in accordance with the present invention.
Figure 26:
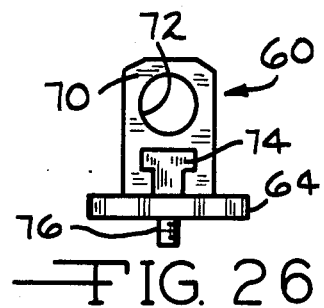
FIG. 26 is an elevational view of one end of the third adapter illustrated in FIG. 23.
Figure 24:
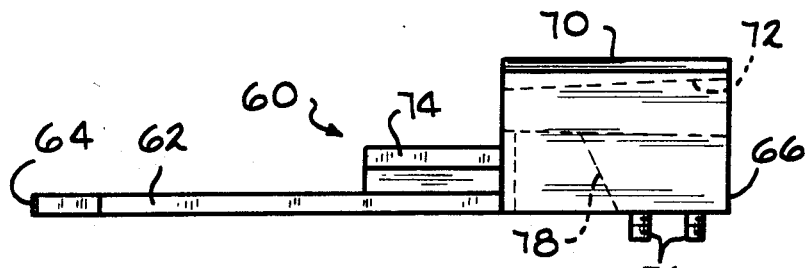
FIG. 24 is an elevational view of of one side of the third adapter illustrated in FIG. 23.
Figure 27:
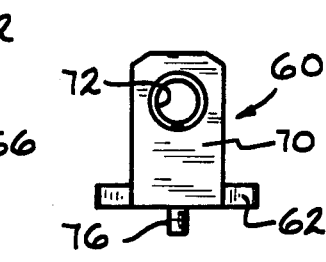
FIG. 27 is an elevational view of the other end of the third adapter illustrated in FIG. 23.
Figure 25:
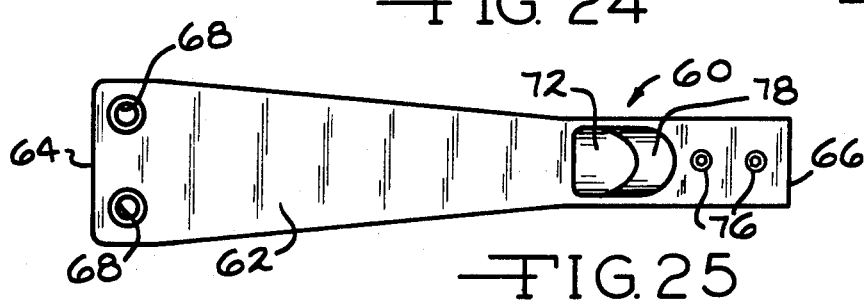
FIG. 25 is a bottom plan view of the third adapter illustrated in FIG. 23.

The inwardly-extending flanges 52 of the second adapter cooperate with the outwardly-extending flanges 40 of the first adapter 28, as illustrated in FIGS. 20 through 22. When so disposed, the curved bottom surface 38 of the first adapter and the curved bottom portion 48 of the second adapter define a generally cylindrical space through which a shaft, indicated in phantom at 58, can extend therethrough. To install the switch assembly 10 in this manner, the first adapter 28 is initially attached to the switch assembly 10 as described above. The curved bottom portion 38 of the first adapter 28 is placed adjacent the shaft 58. The second adapter 46 is next placed adjacent the shaft 58 opposite the first adapter 28 but longitudinally outwardly thereof. The ends of the flange portions 52 of the second adapter are aligned with the ends of the flange portions 40 of the first adapter 28 such that the second adapter 46 is disposed immediately across from the first adapter 28, as illustrated in FIGS. 20 and 21. The threaded fastener 54 can then be rotated to move it upwardly through the curved bottom portion 48 into frictional engagement with the shaft 58. Such frictional engagement securely and reliably attaches the switch assembly 10 to the shaft 58 and prevents relative rotational or longitudinal movement therebetween. Thus, the first and second adapters 28 and 46 of the mounting means of the present invention permit the switch assembly 10 to be secured about any conveniently located cylindrical member in the vehicle.

Referring now to FIGS. 23 through 29, a third adapter, indicated generally at 60, is illustrated. The third adapter 60 includes a flat base 62 which tapers inwardly from a first end 64 to a second end 66. A pair of apertures 68 can be formed through the base 62 near the first end 64 thereof. An upstanding end portion 70 is provided at the other end 66 of the body 62, extending longitudinally inwardly. The end portion 70 has an aperture 72 formed therein. The aperture 72 tapers slightly inwardly from the end 66 of the body 62. At the inner end of the end portion 70, a T-shaped projection 74 is formed. The T-shaped projection 74 is formed integral with the base 62, as is the end portion 70, and extends further inwardly therefrom. A pair of threaded fasteners 76 are provided in respective apertures (not shown) formed through the base 62 and the end portion 70. When rotated, the threaded fasteners 76 are moved upwardly into the passageway 72. A slanted passageway 78 is provided from the aperture 72 to the base 62, the purpose of which will be explained below.

Figure 30:
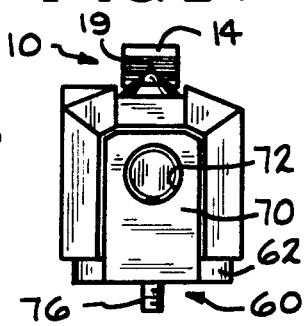
FIG. 30 is an elevational view of one end of the switch housing and third adapter of FIG. 28.
Figure 28:
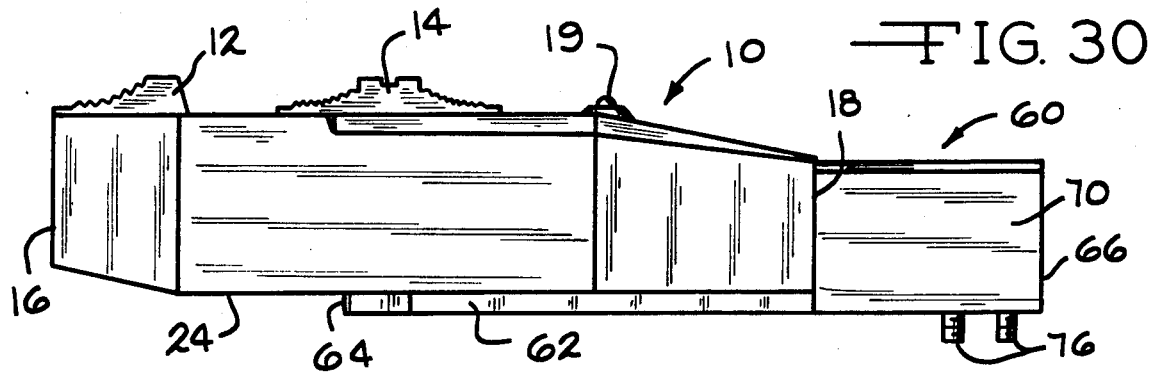
FIG. 28 is a side elevational view of the switch housing of FIG. 1 showing the third adapter of FIG. 24 is mounted thereon.
Figure 29:
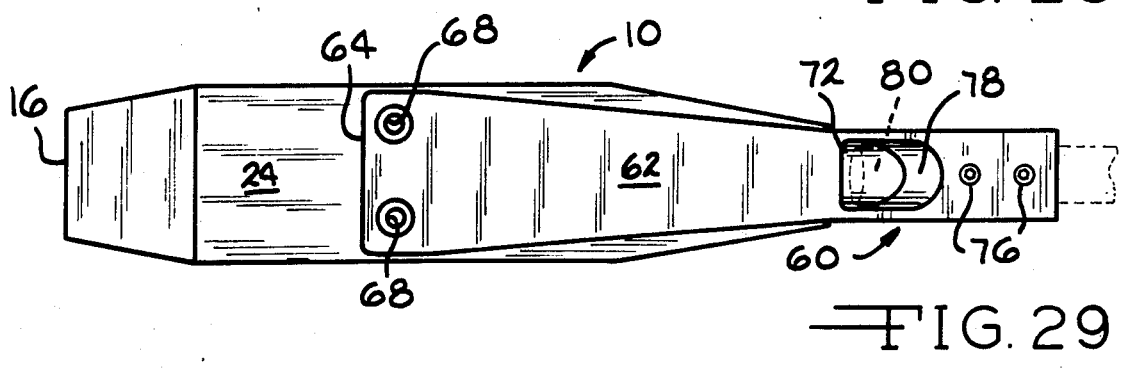
FIG. 29 is a bottom plan view of the switch housing and third adapter of FIG. 28.
Figure 31:
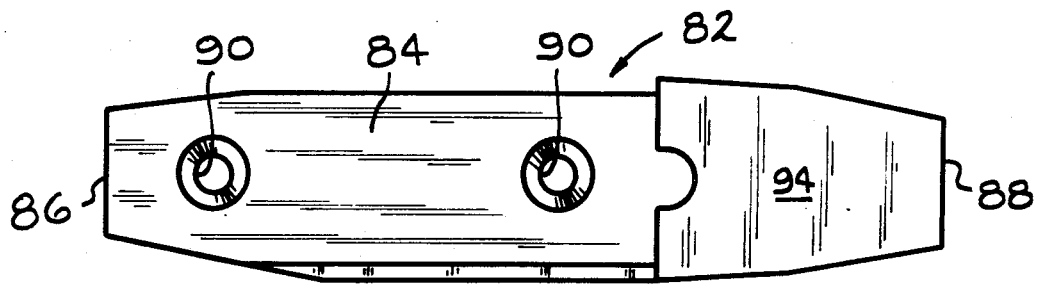
FIG. 31 is a top plan view of a fourth adapter in accordance with the present invention.
Figure 32:
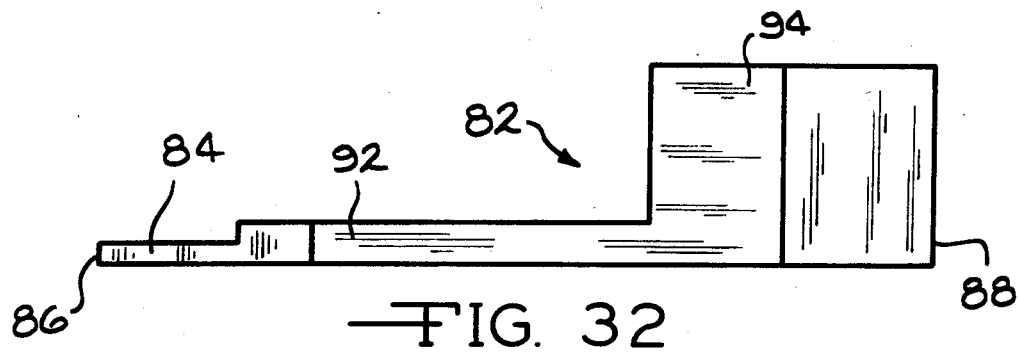
FIG. 32 is an elevational view of one side of the fourth adapter illustrated in FIG. 31.
Figure 33:
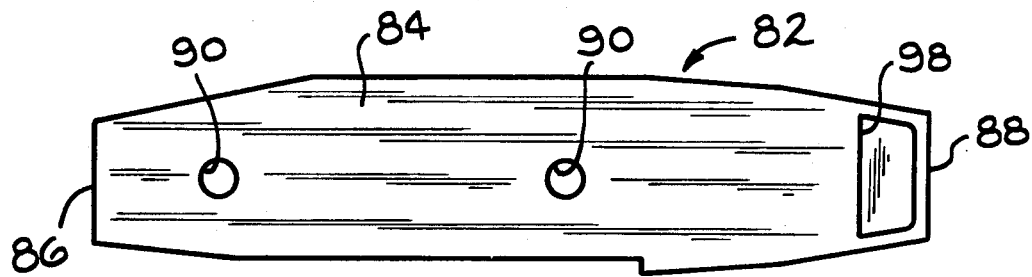
FIG. 33 is a bottom plan view of the fourth adapter illustrated in FIG. 31.
Figure 34:
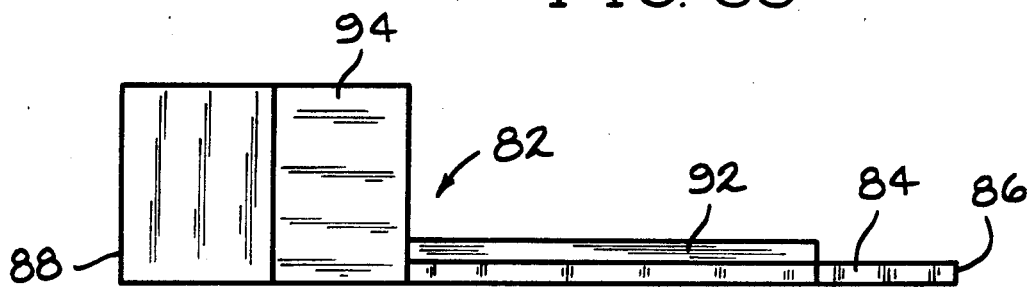
FIG. 34 is an elevational view of the other side of the fourth adapter illustrated in FIG. 31.
Figure 35:
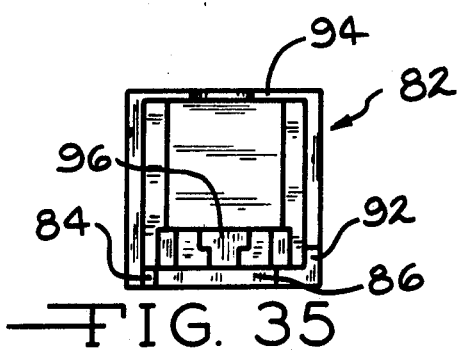
FIG. 35 is an elevational view of one end of the fourth adapter illustrated in FIG. 31.
Figure 36:
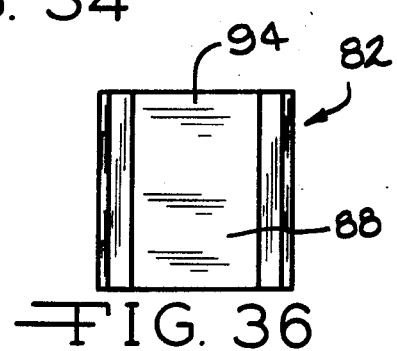
FIG. 36 is an elevational view of the other end of the fourth adapter illustrated in FIG. 31.
Figure 37:
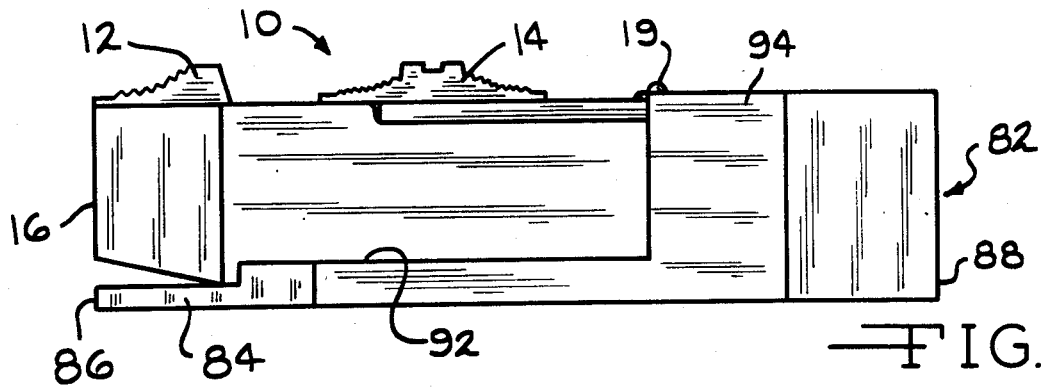
FIG. 37 is a side elevational view of the switch housing of FIG. 1 showing the fourth adapter FIG. 32 mounted thereon.
Figure 38:
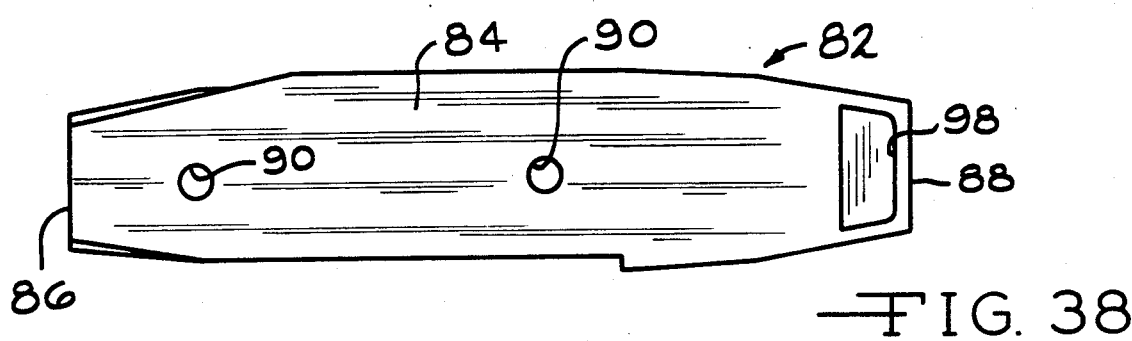
FIG. 38 is a bottom plan view of the switch housing and fourth adapter of FIG. 37.
Figure 39:
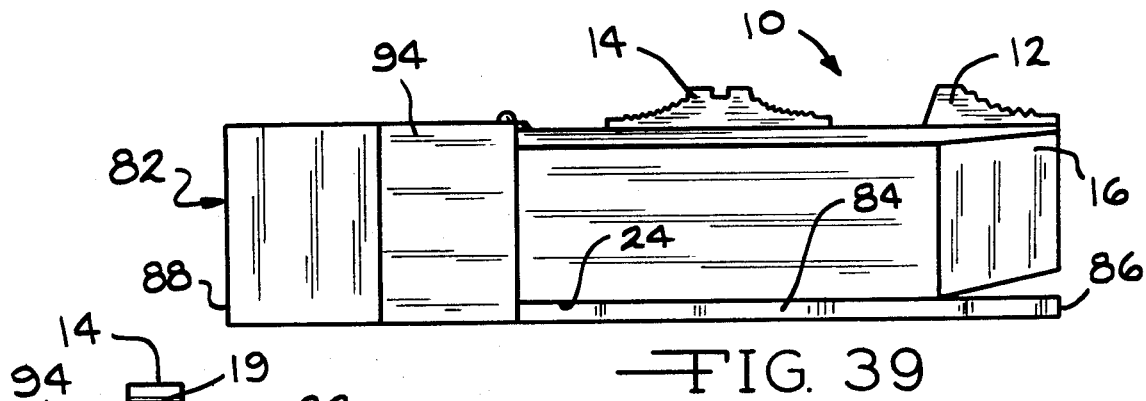
FIG. 39 is an elevational view of the other side of the switch housing and fourth adapter of FIG. 37.
Figure 40:
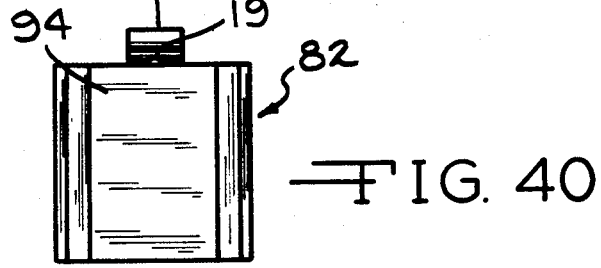
FIG. 40 is an elevational view of one end of the switch housing and fourth adapter of FIG. 37.

The T-shaped projection 74 of the third adapter 60 is adapted to cooperate with the T-shaped aperture 22 formed in the switch housing 10, as illustrated in FIGS. 28 through 30. When so mounted, the base 62 of the third adapter 60 is disposed adjacent the bottom surface 24 of the switch housing, while the end portion 70 extends outwardly from the end side 18. The apertures 68 are positioned so as to be aligned with the apertures 26 when the third adapter 60 is mounted on the switch housing 10. Also, the aperture 72 is positioned so as to be aligned with the aperture 20 such that the wires (not shown) extending out of the aperture 20 can pass therethrough.

The third adapter 60 is provided to mount the switch assembly 10 to the end of a cylindrical shaft. In practice, it has been found to be expedient to simply cut off the end portion of the turn signal lever of the vehicle to provide the cylindrical shaft. However, any similar shaft can be utilized. The end of the shaft is inserted in the tapered aperture 72 until it fits snuggly therein. The threaded fasteners 76 are then rotated so as to frictionally engage the shaft 80. In this manner, the switch assembly 10 is reliably secured to the shaft 80.

Referring now to FIGS. 31 through 40, there is illustrated a fourth mounting adapter, illustrated generally at 82. The fourth adapter 82 includes a generally flat base 86 extending from a first end 84 to a second end 88. A pair of apertures 90 are formed through the base 84. On one side of the base portion 84, an upstanding flange portion 92 is formed. The flange 92 extends toward the other end 88 of the base, where a hollow cover 94 is formed. The cover 94 is formed integral with the base 84 and flange 92. The cover 94 encloses a T-shaped projection 96, which is also formed integral with the base 84. An aperture 98 is formed through the base 84 which extends into the enclosed portion of the cover 94.

The T-shaped projection 96 of the fourth adapter 82 is adapted to cooperate with the T-shaped aperture 22 formed in the switch housing 10 such that the fourth adapter 82 can be secured to the switch housing 10 as illustrated in FIGS. 37 through 40. When so mounted, the flange 92 and the cover 94 fit snuggly against the side and end portion, respectively, of the switch housing 10 so as to provide a firm frictional engagement therebetween. Wires (not shown) passing through the aperture 20 from the switch housing 10 can be fed out of the cover 94 through the aperture 98. The fourth adapter 82 is provided to mount the switch housing 10 on the dashboard or other generally flat surface of the vehicle. The fourth adapter 82 is initially secured to the dashboard by means of fasteners (not shown) which extend through the apertures 90 into threaded engagement. The switch adapter 10 can then be mounted on the fourth adapter 82 as described above. An aperture is normally formed in the dashboard which is coextensive with the aperture 98 to permit the wires passing therethrough to enter behind the dashboard. Thus, the fourth adapter provides an effective means for mounting the switch assembly 10 on the dashboard or other generally flat surface of the vehicle.

Figure 41:
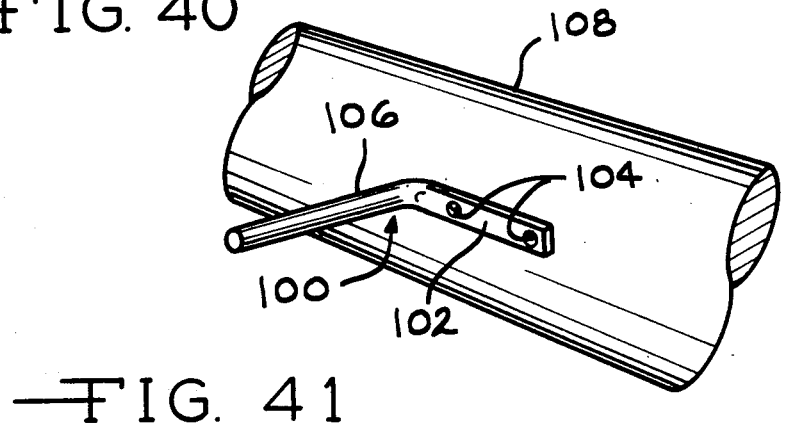
FIG. 41 is a perspective view of an L-shaped mounting bracket attached to a steering column and adapted for use with the above-illustrated adapters.

In some vehicles, none of the above-described mounting methods may be satisfactory. Such a situation might occur when the vehicle does not have a conveniently located cylindrical shaft or flat surface. In such cases, an L-shaped mounting bracket, indicated generally at 100 in FIG. 41, can be utilized to provide a suitable cylindrical shaft upon which the switch housing 10 can be mounted utilizing either the first adapter 28 and second adapter 46 in combination, or the third adapter 60. The mounting bracket 100 includes a generally flat leg 102 having a pair of apertures 104 formed therein. The mounting bracket 100 further includes a generally cylindrical leg 106. Fasteners (not shown) can be utilized to extend through the apertures 104 into threaded engagement with a steering column 108 of the vehicle so as to secure the mounting bracket 100 thereto. Alternatively, the flat leg 102 can be secured to any other conveniently located portion of the vehicle.

In accordance with the provisions of the patent statutes, the principal and mode of operation of the present invention have been explained and illustrated in their preferred embodiments. However, it must be appreciated that the present invention can be practiced otherwise than as specifically explained and illustrated without departing from its spirit or scope.

What is claimed is:

1. A switch assembly adapted to be secured to a vehicle comprising:
    a housing having at least one electrical switch disposed therein, said housing further including an aperture formed therein having a generally T-shaped cross section for receiving a first mounting adapter;
    said mounting adapter including a projection having a generally T-shaped cross section received within said housing aperture to secure said housing to said mounting adapter, said mounting adapter including an elongated body portion extending from an enlarged head portion to an end portion, said end portion including a generally flat surface, said T-shaped projection connected to said flat surface of said end portion; and
    means for securing said mounting adapter to a component of the vehicle.

2. The invention defined in claim 1 wherein said mounting adapter further includes a curved surface formed on a side of said mounting adapter different from said one side thereof connected to said T-shaped projection.

3. The invention defined in claim 2 wherein said curved surface is formed by a pair of side portions extending from said body portion so as to define said curved surface.

4. The invention defined in claim 3 wherein each of said side portions includes an outwardly-extending flange.

5. The invention defined in claim 4 further including a second mounting adapter having a curved bottom portion and a pair of side portions, each of said side portions terminating in an inwardly-extending flange adapted to cooperate with a respective one of said outwardly-extending flanges formed on said first mounting adapter such that the component of the vehicle is enclosed therebetween.

6. The invention defined in claim 1 wherein said mounting adapter includes a flat base having an upstanding end portion formed at one end thereof, said T-shaped projection being formed integral with said base, and said end portion including an aperture formed therein adapted to receive the component of the vehicle.

7. The invention defined in claim 6 further including a threaded aperture extending radially from said end portion aperture and a set screw disposed in said threaded aperture adapted to frictionally engage the component of the vehicle when inserted within said end portion aperture.

8. The invention defined in claim 1 wherein said mounting adapter includes a generally flat base having a hollow cover formed integrally therewith at one end, said T-shaped projection being formed integral with said base within said hollow cover.

9. A switch assembly adapted to be secured to a vehicle comprising:
   a housing having at least one electrical switch disposed therein, said housing further including an aperture formed therein for receiving a mounting adapter;
   said mounting adapter including a projection received within said housing aperture to secure said housing to said mounting adapter, said mounting adapter including a flat base having an upstanding end portion formed at one end thereof, said projection being formed integral with said flat base to secure said housing adjacent to said flat base, and said end portion including an aperture formed therein adapted to receive a component of the vehicle; and
   means for securing said mounting adapter to the component of the vehicle.

10. The invention defined in claim 9 further including a threaded aperture extending radially from said end portion aperture and a set screw disposed in said threaded aperture adapted to frictionally engage the component of the vehicle when inserted within said end portion aperture.

11. A switch assembly adapted to be secured to a vehicle comprising:
   a housing having at least one electrical switch disposed therein, said housing further including an aperture formed therein for receiving a mounting adapter;
   said mounting adapter including a projection received within said housing aperture to secure said housing to said mounting adapter, said mounting adapter including a base having a hollow cover formed integrally therewith at one end, said projection being formed integral with said base within said hollow cover to secure said housing adjacent said base; and
   means for securing said mounting adapter to a component of the vehicle.

* * * * *